June 3, 1930.  F. M. CARROLL  1,761,774
ONE-REVOLUTION CLUTCH
Filed June 15, 1927   2 Sheets-Sheet 1
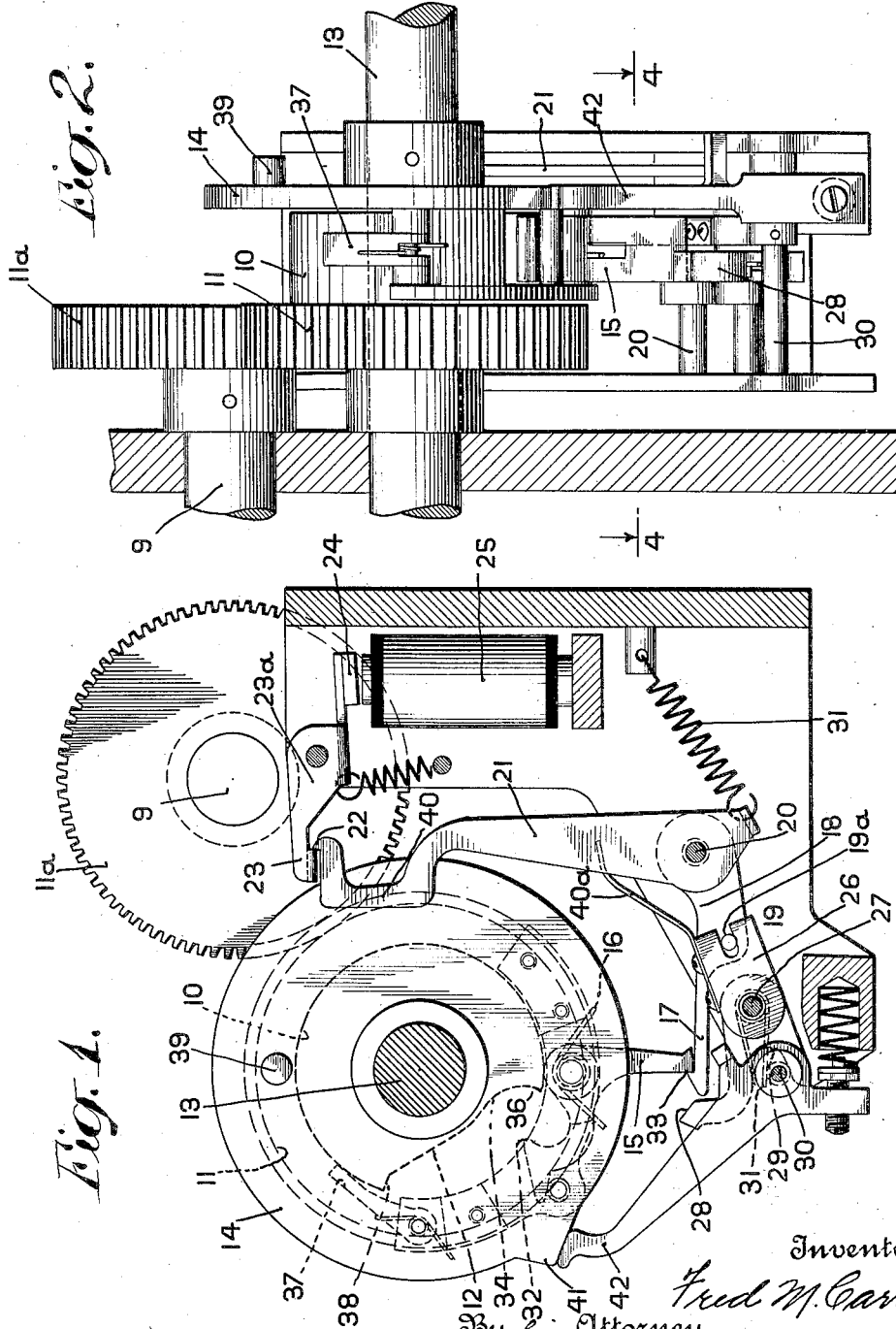

June 3, 1930.  F. M. CARROLL  1,761,774
ONE-REVOLUTION CLUTCH
Filed June 15, 1927  2 Sheets-Sheet 2
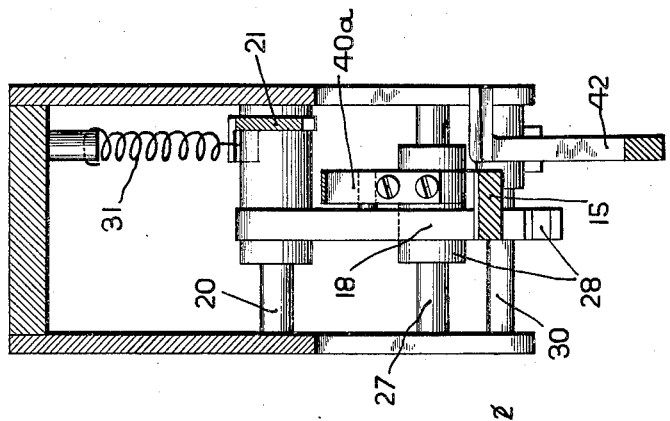
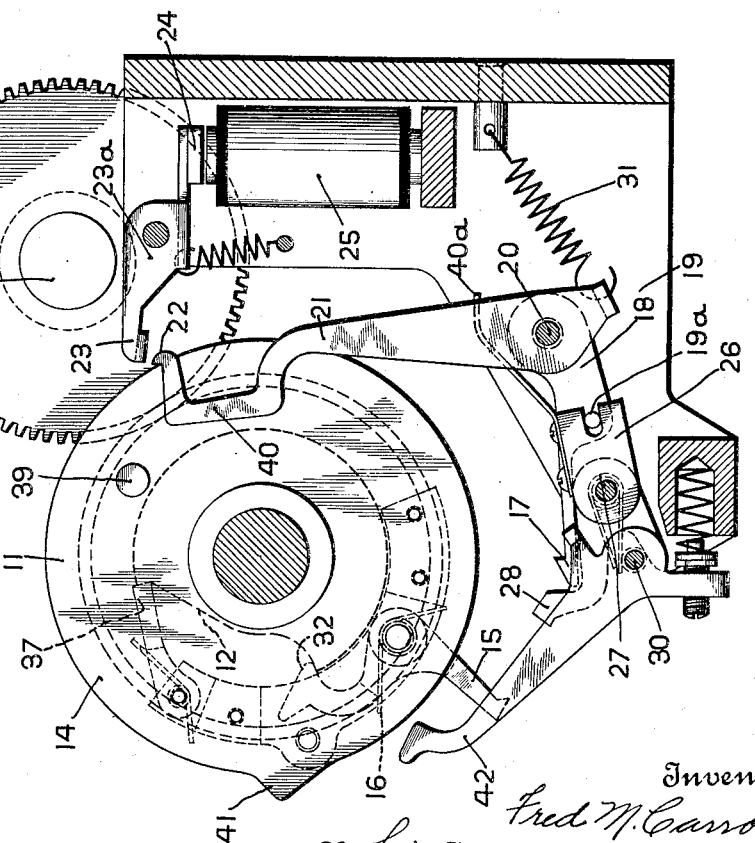
Inventor
Fred M. Carroll
By his Attorney
W. M. Wilson Patented June 3, 1930

1,761,774

UNITED STATES PATENT OFFICE

FRED M. CARROLL, OF YONKERS, NEW YORK, ASSIGNOR TO THE TABULATING MACHINE COMPANY, OF ENDICOTT, NEW YORK, A CORPORATION OF NEW JERSEY

ONE-REVOLUTION CLUTCH

Application filed June 15, 1927. Serial No. 198,905.

The invention relates to a clutch mechanism and more particularly to a so called one revolution clutch of the type widely used in automatic accounting machines.

In the operation of accounting and other cyclically operable machines it is frequently necessary that certain parts be connected to the driving mechanism for one or more complete cycles and then be disconnected therefrom so that they always come to rest in a predetermined position. For example, a certain shaft may have to be clutched to another driving shaft to cause it to make one or more complete revolutions or a predetermined portion of a revolution and then be disconnected so that it assumes its original position or a position definitely related to its original position. The usual type of clutch used for this purpose is called a one revolution clutch and consists of a notched disk on the driving shaft and a coacting disk on the driven shaft carrying a pawl urged to engage the notch. The pawl is normally held out of engaging position by a latch so that the driving shaft rotates freely but momentary releases of the latch causes the pawl to engage the notch and rotate the disk carrying it with the notched disk. After a single revolution or a predetermined portion of a revolution the latch again engages the pawl and releases it from the notch and thereafter the pawl is held out of clutching position and the driven disk is held stationary until the latch is again released.

The pawls and the coacting notches of these clutches have hitherto been provided with straight coacting edges so that on clutching engagement the driven part starts suddenly being forced to attain the speed of the driving member substantially instantaneously. Also on stopping as the pawl latch has usually acted as a stop member as well as a releasing member for the driven disk this disk is also stopped with a jerk. Consequently both the starting and stopping operations have occasioned sudden shocks to the machinery from which unusual wear and tear results.

It is necessary that during a certain portion of each cycle any driving part maintain absolute synchronism with the driven part but this portion of the cycle practically always starts an appreciable time after the beginning of the cycle and ends an appreciable time prior to the end of the cycle. This is taken advantage of according to the present invention to start the driving member slowly at the beginning of each clutching action, only establishing actual driving connection when the two parts are running at practically the same speed. At the end of the active portion of the cycle the pawl is released before the driven member reaches its normal rest position so that it may coast to the rest position, losing speed meanwhile through braking mechanism if necessary, and when finally it reaches rest position and is stopped its momentum is practically dissipated.

According to the preferred form of the invention the usual straight edge notch in the driving disk is replaced by one having a straight portion at the periphery of the disk joining a curved surface extending to the bottom of the notch. When the clutching pawl is released its nose encounters the curved surface and as the driven disk is still stationary the pawl is cammed by the curved surface, causing it to rotate about its pivot. The pawl is provided with an extending arm which during this rotating action coacts with a stationary cam or fulcrum member whereby the driven disk is cammed in the direction in which the driving disk is moving. When the nose of the pawl finally reaches the flat portion of the notch at the periphery of the driving disk to establish driving connections both disks are moving at substantially the same speed and the clutching operation has been effected without sudden jerks or shocks to any of the parts. Toward the end of the cycle the pawl is released by a subsidiary member an appreciable time before it reaches its restraining latch and the driven disk with the pawl coast to home position; losing momentum until, when the pawl is finally latched, the disk has practically stopped.

An object of my invention is to provide a clutching mechanism that will operate smoothly and without shock to its associated members.

Another object is to provide a clutch of the one revolution type in which the driven member is started with gradually increasing speed.

Another object is to provide a clutch of this type in which clutching action is effected with the driving and driven members moving at substantially the same speed.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the accompanying drawings I have shown for the purpose of illustration one form of structure embodying my invention in which:

Fig. 1 is an elevational view of the clutch mechanism in inoperative position.

Fig. 2 is a front elevational view of the clutching mechanism.

Fig. 3 is a view similar to Fig. 1 showing the clutch engaged.

Fig. 4 is a detail taken on line 4—4 of Fig. 2.

The clutch has been illustrated by way of example as a connecting or clutching mechanism between a driving shaft 9 and a driven shaft 13. The driving shaft 9 rotates constantly while the driven shaft 13 is normally stationary but may be clutched to rotate with the driving shaft by means of the clutch to be hereinafter described and when so clutched will make one complete revolution and then automatically stop unless the clutch releasing mechanism is again actuated. The driven shaft therefore always makes one or more complete revolutions and always comes to rest in the same position The clutch consists of a disk 10 rigid with the gear 11 and having a notch 12 of a peculiar form in its periphery. This disk with its connected gear is freely mounted on the shaft 13 and is driven constantly by gear 11ª fixed to shaft 9 and meshing with gear 11. A second disk 14 is fixed on the shaft 13 and carries a pivoted operating pawl 15 urged by a spring 16 to constantly engage in the notch 12 but normally restrained from doing so by a latch 17. The disks 10 and 14 comprise the two coacting elements of the clutch. The latch 17 is mounted on one element 18 of a toggle indicated generally at 19, the element 18 being fixed to a shaft 20 to which is also fixed an extending arm 21 having a hooked portion 22 at its upper end which is engaged by a coacting hook 23 on the pivoted structure supporting the armature 24 of a magnet 25. The other element of the toggle 19 consists of an arm 26 pivoted on a shaft 27 and connected with the element 18 by a pin and slot connection indicated at 19ª. Mounted on the shaft 27 (see also Fig. 4) is a member having a doubled bevelled upwardly extending portion projecting into the path of the tail piece of the pawl 15. The member 28 is also provided with a notch 29 which straddles a shaft 30 and limits the movement of the member. A light spring 31 urges the member 28 clockwise holding the lower edge of the notch 29 against shaft 30.

Clutching engagement between the disks 10 and 14 is effected by energization of the magnet 25 which attracts its armature 24, rocking the pivoted armature supporting structure 23ª and releasing the arm 21 which moves counterclockwise in response to the action of spring 31. The toggle 19 thereupon breaks, causing the latch 17 to release the pawl 15. The pawl then rocks clockwise under action of its spring 16 and its nose 32 is moved to the bottom of the notch 12 in moving member 10, while its tail piece 33 snaps past the bevelled end of member 28, the biasing spring of the latter yielding to permit this action. The trailing edge of the notch 12 as indicated at 34 consists of a smooth curved surface terminating at the periphery of the disk in a slightly undercut portion 36. As the disk 14 on which the pawl 15 is pivotally mounted still tends to remain stationary, the curved surface 34 on the moving disk 10 cams the pawl counterclockwise, forcing its tail piece 33 against the left hand bevelled surface on the upper end of member 28 thereby forcing the disk 14 in a clockwise direction, that is, in the same direction as the disk 10 is moving. Owing to the configuration of the curved surface 34 this camming action on the pawl starts the disk 14 rotating with a gradually increasing speed and when the nose 32 of the pawl reaches the undercut portion 36, clutching the disks together, the two disks 10 and 14 will be moving at substantially the same speed and the clutching operation will be effected with no shock to its associated parts. When the nose 32 of the pawl engages the undercut portion 36, a latch pawl 37 pivotally mounted on the disk 14 slips into the notch 12 and engages a flat edge 38 of the notch, firmly locking the disks together in a predetermined relative position. The shaft 13 will continue to rotate until the pawl 15 is again latched by latch 17. The latter, of course, has been moved out of the path of the extending tail piece of the pawl by the breaking of the toggle 19 and cannot re-engage the pawl until the toggle is restored to the position shown in Fig. 1. Once each revolution during rotation of disk 14, a pin 39 on disk 14 encounters an offset portion 40 on arm 21 and rocks it clockwise to its latching position. This restores the toggle 19 and if the pivoted supporting structure of armature 24 is in latching position at this time its hook 23 will engage the hook 22 on arm 21 and hold toggle 19 in its restored position as shown in Fig. 1, moving latch 17 into position to engage the tail piece 33 of pawl 15. At the end of the revolution of shaft 13, providing the magnet 25 has not been energized at the proper time during this revolution, the clutch 10—14 will disengage in the manner to be presently described.

Considering that the toggle 19 remains in its restored position as in Fig. 1, a leaf spring 40ª fixed on toggle member 19 projects into the path of the tail piece of pawl 15 and when the tail piece encounters this spring the pawl is rocked counterclockwise causing its nose 32 to move out of the slot 12 thereby releasing the clutching action between disks 10 and 14. Due to the momentum of the parts, however, the disk 14 coasts a short distance and just before the tail piece of the pawl 15 reaches the latch 17, a projection 41 on the disk 14 encounters a spring pressed braking and impositive latching arm 42 whereupon its momentum is further overcome and the latch 17 encounters the tail piece 33 of the pawl 15 and latches it after the motion of disk 14 has practically ceased. The end of the arm 42 now rides onto the trailing edge of projection 41 on the disk 14 and forces the disk to cause the tail piece 33 of the pawl 15 to seat firmly against the latching hook of latch 17, unless it is already in this position and thereafter holds the disk 14 firmly in its rest position.

The explanation thus far has dealt with a condition under which only one revolution of the shaft 13 is desired and the one revolution has been effected by a single momentary energization of magnet 25. It is obvious, however, that the shaft 13 could be driven for any number of complete revolutions by energizing the magnet 25 at the proper time during each revolution to release the latching mechanism before unclutching of the disks has actually occurred. The pin 39 on disk 14 rocks the arm 21 into latching position and it will be latched by the armature structure if the magnet is not energized at this time. The pin 39 rocks the arm 21, however, before the tail piece 33 of pawl 15 reaches the spring 40ª and if the magnet is energized either at the time when arm 21 is rocked to latching position or between the time when the arm 21 is rocked by the pin and the time when pawl 15 reaches spring 40ª the spring will move back to unlatching position and the clutching action of the disks will continue for another revolution. By proper energizations of the magnet 25, then, the shaft 13 may be driven any desired number of complete revolutions.

The invention has now been described and explained in connection with a complete operative embodiment but it will be obvious that many modifications will readily occur to those skilled in the art; for example, the clutch latching mechanism may be operated mechanically instead of by an electromagnet. Furthermore, while the example chosen for the purpose of explanation deals with a clutch of the one revolution type, it is obvious that it could be arranged to drive for any portion of a revolution by providing additional notches in the driving disk and additional latch resetting pins on the driven disk. Several examples of the adaptation of the clutch in different forms are illustrated in my copending application Serial No. 185,711 filed April 22, 1927. I intend to be limited only as indicated by the scope of the following claims:

1. A clutch mechanism comprising a driving element and a driven element, a clutching pawl mounted on one of said elements, the other of said elements provided with a notch having a curved camming surface joining a straight edge portion, means for moving said pawl into the notch to effect camming action thereon by the curved surface followed by clutching cooperation with the straight edge portion and means coacting with the pawl during the camming action to start and accelerate the driven element prior to the clutching operation.

2. A clutch mechanism comprising a driving element and a driven element, a clutching pawl pivoted on said driven element and means for yieldably forcing it towards the driving element, said driving element being provided with a notch having a flat edge to engage said pawl and a curved surface joining said edge whereby said pawl will be cammed by said curved surface before engaging said edge, a stationary member and an extension on said pawl to coact therewith during the camming operation to start and accelerate said driven member.

3. A one revolution clutch comprising a driving element and a driven element, a clutching pawl mounted on the driven element with means for yieldably urging it toward the driving element, said driving element being provided with a notch to be engaged by said pawl for clutching operation, a latch coacting with said pawl to hold it out of clutching engagement with the driven member in a predetermined position, and yieldable means for engaging said latch during rotation of the driven member for releasing said pawl and decelerating the driven member prior to the operation of said latch to hold the pawl out of clutching position.

4. A clutch mechanism comprising a driving element and a driven element, one of said elements having a movable clutching member mounted thereon and the other having a notch formed with a cam surface said cam surface being adapted to cam said member into clutching position and means coacting with said member during the camming operation for accelerating the driven member.

In testimony whereof I hereto affix my signature.

FRED M. CARROLL.